United States Patent
Roether et al.

(10) Patent No.: US 10,988,126 B2
(45) Date of Patent: Apr. 27, 2021

(54) SOLENOID VALVE ASSEMBLY FOR A BRAKING SYSTEM FOR A VEHICLE, BRAKING SYSTEM FOR A VEHICLE, AND METHOD FOR MOUNTING A SOLENOID VALVE ASSEMBLY FOR A BRAKING SYSTEM FOR A VEHICLE

(71) Applicant: KNORR-BREMSE SYSTEME FUER NUTZFAHRZEUGE GMBH, Munich (DE)

(72) Inventors: Friedbert Roether, Cleebronn (DE); Ralf Woerner, Tiefenbronn (DE); Kai Werner, Ludwigsburg (DE); Gerhard Wieder, Besigheim (DE)

(73) Assignee: KNORR-BREMSE SYSTEME FUER NUTZFAHRZEUGE GMBH, Munich (DE)

( * ) Notice: Subject to any disclaimer, the term of this patent is extended or adjusted under 35 U.S.C. 154(b) by 13 days.

(21) Appl. No.: 16/327,902

(22) PCT Filed: Aug. 9, 2017

(86) PCT No.: PCT/EP2017/070258
§ 371 (c)(1),
(2) Date: Feb. 25, 2019

(87) PCT Pub. No.: WO2018/041576
PCT Pub. Date: Mar. 8, 2018

(65) Prior Publication Data
US 2019/0193706 A1  Jun. 27, 2019

(30) Foreign Application Priority Data

Sep. 5, 2016  (DE) ..................... 10 2016 116 516.6

(51) Int. Cl.
*B60T 13/68*    (2006.01)
*F16K 31/42*    (2006.01)
(Continued)

(52) U.S. Cl.
CPC .......... *B60T 13/683* (2013.01); *B60T 8/3605* (2013.01); *B60T 15/027* (2013.01);
(Continued)

(58) Field of Classification Search
CPC ...... F16K 27/003; F16K 31/42; F16K 31/423; F16K 31/426; B60T 8/3605; B60T 13/68;
(Continued)

(56) References Cited

U.S. PATENT DOCUMENTS 3,977,734 A * 8/1976 Ronnhult .............. B60T 8/3605
                                                    303/119.3
6,659,129 B1 * 12/2003 Kiel ........................ B60T 8/361
                                                    137/596.16
(Continued)

FOREIGN PATENT DOCUMENTS

DE   3921078 A1   1/1991
DE   4136244 A1   5/1993
(Continued)

OTHER PUBLICATIONS

International Search Report dated Oct. 25, 2017, of the corresponding International Application PCT/EP2017/070258 filed Aug. 9, 2017.

*Primary Examiner* — Matthew W Jellett
(74) *Attorney, Agent, or Firm* — Norton Rose Fulbright US LLP; Gerard Messina (57) ABSTRACT

A solenoid valve apparatus for a brake system for a vehicle, including: a main valve unit; a pilot-control valve unit that is fluidically connected to the main valve unit; and a housing to accommodate at least the main valve unit and the pilot- (Continued)

control valve unit; in which the pilot-control valve unit includes a double solenoid unit and at least one valve device, in which the double solenoid unit is formed such that it can be populated with at least one valve device, and in which the double solenoid unit has at least two accommodating portions for accommodating valve devices and at least two solenoid devices for actuating valve devices. Also described are a related braking system and a related method for mounting a solenoid valve assembly for a braking system for a vehicle.

13 Claims, 6 Drawing Sheets

(51) Int. Cl.
  *B60T 15/02* (2006.01)
  *F16K 27/00* (2006.01)
  *B60T 8/36* (2006.01)
(52) U.S. Cl.
  CPC ............ *F16K 27/003* (2013.01); *F16K 31/42* (2013.01); *F16K 31/423* (2013.01); *F16K 31/426* (2013.01); *Y10T 137/5987* (2015.04); *Y10T 137/6011* (2015.04); *Y10T 137/7504* (2015.04); *Y10T 137/7668* (2015.04); *Y10T 137/86622* (2015.04); *Y10T 137/87169* (2015.04); *Y10T 137/87217* (2015.04); *Y10T 137/87225* (2015.04); *Y10T 137/87917* (2015.04)
(58) Field of Classification Search
  CPC ................ B60T 13/683; B60T 15/027; Y10T 137/5987; Y10T 137/6011; Y10T 137/7504; Y10T 137/7668; Y10T 137/86622; Y10T 137/87169; Y10T 137/87217; Y10T 137/87225; Y10T 137/87917
  See application file for complete search history.

(56) References Cited

U.S. PATENT DOCUMENTS

| | | | | |
|---|---|---|---|---|
| 7,222,922 | B2* | 5/2007 | Corley, Jr. | B60T 8/3605 303/119.2 |
| 7,415,341 | B2* | 8/2008 | Goebels | B60R 16/0233 303/113.2 |
| 7,905,557 | B2* | 3/2011 | Frank | B60T 8/327 137/613 |
| 8,434,520 | B2* | 5/2013 | Frank | B60T 8/327 137/315.03 |
| 8,672,421 | B2* | 3/2014 | Eidenschink | B60T 8/3605 303/119.1 |
| 9,157,543 | B2* | 10/2015 | Herges | B60T 15/182 |
| 9,676,378 | B2* | 6/2017 | Kiel | B60T 15/00 |
| 10,011,253 | B2* | 7/2018 | Knoke | B60T 8/3605 |
| 10,112,590 | B2* | 10/2018 | Klik | B60T 8/342 |
| 2012/0175943 | A1* | 7/2012 | Grebe | F16K 7/17 303/113.2 |

FOREIGN PATENT DOCUMENTS

| | | |
|---|---|---|
| DE | 10009116 A1 | 8/2001 |
| DE | 102004035763 A1 | 3/2006 |
| DE | 102014012712 A1 | 3/2016 |
| WO | 2008/034524 A1 | 3/2008 |

* cited by examiner

SOLENOID VALVE ASSEMBLY FOR A BRAKING SYSTEM FOR A VEHICLE, BRAKING SYSTEM FOR A VEHICLE, AND METHOD FOR MOUNTING A SOLENOID VALVE ASSEMBLY FOR A BRAKING SYSTEM FOR A VEHICLE

FIELD OF THE INVENTION

The present invention relates to a solenoid valve apparatus for a brake system for a vehicle, to a brake system for a vehicle, and to a method for assembling a solenoid valve apparatus for a brake system for a vehicle.

BACKGROUND INFORMATION

In the case of pneumatic appliances with one or more externally situated valve solenoids, the valve solenoids may for example be fastened by separate holders.

SUMMARY OF THE INVENTION

The present invention is based on the object of providing an improved solenoid valve apparatus for a brake system for a vehicle, an improved brake system for a vehicle and an improved method for assembling a solenoid valve apparatus for a brake system for a vehicle.

According to the invention, said object is achieved by a solenoid valve apparatus for a brake system for a vehicle, by a brake system for a vehicle and by a method for assembling a solenoid valve apparatus for a brake system for a vehicle having the features of the main claims. Advantageous embodiments and refinements of the invention will emerge from the subclaims that follow.

In embodiments of the present invention, it is possible, in particular for a brake system of a vehicle, for a solenoid valve to be used in the case of which, for the pilot control, use may basically be made of a double solenoid which may for example be populated, or equipped with valve components, on one side or both sides in a manner dependent on the functional scope of the brake system or intended use of the solenoid valve. It is possible for one pilot-control valve or for example two pilot-control valves to be provided in a manner dependent on a specific use of the solenoid valve, and in a scalable manner.

In embodiments of the present invention, it is advantageously possible in particular to realize a simplified fastening of the double solenoid in a valve apparatus. Owing to the nature of the scalability, it is for example possible for a wiring harness and a pipe arrangement in the vehicle to remain the same regardless of whether one pilot-control valve or two pilot-control valves are provided. It is thus for example possible for a valve apparatus for a brake system in the vehicle to be configured in a fundamentally scalable or adaptable manner without the need for modifications to be made to the vehicle in the event of scaling or adaptation. This scalability may be produced in particular by virtue of the fact that a double solenoid can always be used which can be populated on one side for one mode of operation and on both sides for another mode of operation.

A solenoid valve apparatus for a brake system for a vehicle is proposed, wherein the solenoid valve apparatus has a main valve unit, a pilot-control valve unit which is fluidically connected to the main valve unit, and a housing for accommodating at least the main valve unit and the pilot-control valve unit, wherein the pilot-control valve unit has a double solenoid unit and at least one valve device, wherein the double solenoid unit is formed such that it can be populated with at least one valve device, wherein the double solenoid unit has at least two accommodating portions for accommodating valve devices and at least two solenoid devices for actuating valve devices.

The vehicle may be a motor vehicle, in particular a utility vehicle or some other road-going vehicle or track-bound vehicle. The solenoid valve apparatus may also be referred to as a valve apparatus. The solenoid valve apparatus may for example be used as a front-axle module, rear-axle module, relay valve or other brake control valve in the brake system. The solenoid valve apparatus may be a pilot-controlled solenoid valve or a solenoid valve with pilot control. The solenoid valve apparatus may be provided for pneumatic or hydraulic operation.

In one embodiment, the accommodating portions and the solenoid devices of the double solenoid unit may be enclosed by a common body of the double solenoid unit. Here, the double solenoid unit may be of single-part or multi-part configuration. Such an embodiment offers the advantage that the pilot-control valve unit can be assembled easily, reliably and quickly, wherein it is always possible for both solenoid devices of the double solenoid units to be installed.

It is also possible for the double solenoid unit to be arrangeable or arranged in clamped fashion in the housing. Such an embodiment offers the advantage that simple, stable and quick assembly of the double solenoid unit, and thus of the pilot-control valve unit, is made possible.

Furthermore, the housing may have at least one closing device, by which the housing can be openable or closable in order to make at least the pilot-control valve unit accessible. The closing device may for example be formed as a screw, as a clamp or as some other fastening means. Such an embodiment offers the advantage that at least the pilot-control valve unit can be accessed easily and quickly, and assembly and populating of the pilot-control valve unit can be performed easily and quickly.

In one embodiment, the housing may have a first housing part and a second housing part. Here, the housing parts may be connectable or connected to one another in non-positively locking and additionally or alternatively positively locking fashion. The double solenoid unit may be arrangeable or arranged in clamped fashion between the housing parts. The housing parts may be connectable or connected to one another by at least one closing device. Such an embodiment offers the advantage that stable assembly in particular of the pilot-control valve unit and easy populating of the same and reliable and uncomplicated housing of valve components can be made possible.

In particular, the housing may be formed at least partially from a metallic material. Alternatively, the housing may be formed partially from a metallic material and partially from a plastics material. For example, a first housing part of the housing may be formed from a metallic material, wherein a second housing part of the housing may be formed from a plastics material. Such an embodiment offers the advantage that stability and robustness and possibly weight savings can be realized in the case of the housing.

Furthermore, the pilot-control valve unit may have an electrical connector for the contacting of the double solenoid unit. Here, a plug connector portion of the electrical connector may extend out of the housing. Such an embodiment offers the advantage that easy electrical contacting and thus actuation of the pilot-control valve unit can be achieved. It is also possible for cable clamping to be made possible for the purposes of relieving an electrical cable that is connected to the plug connector portion of tension.

In one embodiment, the valve device may be accommodated in a first of the accommodating portions of the double solenoid unit and a second of the accommodating portions of the double solenoid unit may be unpopulated. Alternatively, the valve device may be accommodated in a first of the accommodating portions of the double solenoid unit, and a further valve device may be accommodated in a second of the accommodating portions of the double solenoid unit. Such an embodiment offers the advantage that, depending on the mode of operation or intended use of the solenoid valve apparatus, a suitable population of the pilot-control valve unit with one or two valve devices can be selected. In the case of population on both sides, it is also possible for intermediate pressures to be set in controlled fashion.

It is also possible for the solenoid valve apparatus to have at least one check valve. Here, the check valve may be connected between a control fluid port of the solenoid valve apparatus and the main valve unit, fluidically in parallel with respect to the pilot-control valve unit. Alternatively or in addition, the check valve may be connected between a reservoir fluid port of the solenoid valve apparatus and the pilot-control valve unit, fluidically in parallel with respect to the main valve unit. The at least one check valve may be configured as a check valve on one side, and may additionally or alternatively be configured as a pressure-limiting valve. Such an embodiment offers the advantage that an outflow of pressure toward the control fluid port can be avoided, and a braking demand by a driver of the vehicle can be prioritized in relation to automatic braking demands generated in both ways by assistance systems.

Furthermore, the solenoid valve apparatus may have at least one reservoir fluid port for the connection of the solenoid valve apparatus to a fluid reservoir of the brake system. Here, the at least one reservoir fluid port may be fluidically connected to the main valve unit and to the pilot-control valve unit. It is also possible for the solenoid valve apparatus to have at least one consumer fluid port for the connection of the solenoid valve apparatus to a consumer of the brake system. Here, the at least one consumer fluid port may be fluidically connected to the main valve unit. Furthermore, the solenoid valve apparatus may have at least one control fluid port for the connection of the solenoid valve apparatus to a control device of the brake system. Here, the at least one control fluid port may be fluidically connected to the main valve unit via the pilot-control valve unit. Such an embodiment offers the advantage that the number of ports can be identical in the case of population of the double solenoid unit on one side and on both sides, and thus a pipe arrangement in the vehicle can remain the same in the case of both configuration variants.

Alternatively, the solenoid valve apparatus may have at least one reservoir fluid port for the connection of the solenoid valve apparatus to a fluid reservoir of the brake system. Here, the at least one reservoir fluid port may be fluidically connected to the main valve unit. Furthermore, the solenoid valve apparatus may have at least one channel for the ventilation of the solenoid valve apparatus. Here, the at least one channel may be fluidically connected to the pilot-control valve unit. The solenoid valve apparatus may also have at least one consumer fluid port for the connection of the solenoid valve apparatus to a consumer of the brake system. Here, the at least one consumer fluid port may be fluidically connected to the main valve unit. Furthermore, the solenoid valve apparatus may have at least one control fluid port for the connection of the solenoid valve apparatus to a control device of the brake system. Here, the at least one control fluid port may be fluidically connected to the main valve unit via the pilot-control valve unit. Such an embodiment offers the advantage that the solenoid valve apparatus can thus be utilized as a pressure dissipation valve and/or pressure-maintaining valve, in particular for ABS (anti-lock system) control.

Also proposed is a brake system for a vehicle, wherein the brake system has at least one unit of an embodiment of the solenoid valve apparatus mentioned above.

In conjunction with the brake system, at least one unit of an embodiment of the solenoid valve apparatus mentioned above can be advantageously used for actuating at least one brake device.

In one embodiment, the at least one solenoid valve apparatus is configured to actuate a front axle and/or a rear axle of the vehicle. Here, it is also possible for the brake system to have at least one switching valve, wherein the at least one solenoid valve apparatus and the at least one switching valve may be configured to interact. Such an embodiment offers the advantage that the solenoid valve apparatus can be used for a front-axle module and/or for a rear-axle module.

Also proposed is a method for assembling a solenoid valve apparatus for a brake system for a vehicle, having
a step of providing an embodiment of the solenoid valve apparatus mentioned above,
a step of arranging the double solenoid unit in the pilot-control valve unit,
a step of inserting the at least one valve device into at least one of the accommodating portions of the double solenoid unit in order to populate the double solenoid unit, and a step of closing the housing in order to house the pilot-control valve unit and the main valve unit.

By carrying out the method, an embodiment of the solenoid valve apparatus mentioned above can be assembled in an advantageous manner.

Exemplary embodiments of the approach proposed here are illustrated in the drawings and will be discussed in more detail in the description below. In the drawings.

DETAILED DESCRIPTION

In the following description of expedient exemplary embodiments of the present invention, identical or similar reference designations will be used for elements of similar action illustrated in the various figures, wherein a repeated description of such elements will be omitted.

Figure 1:
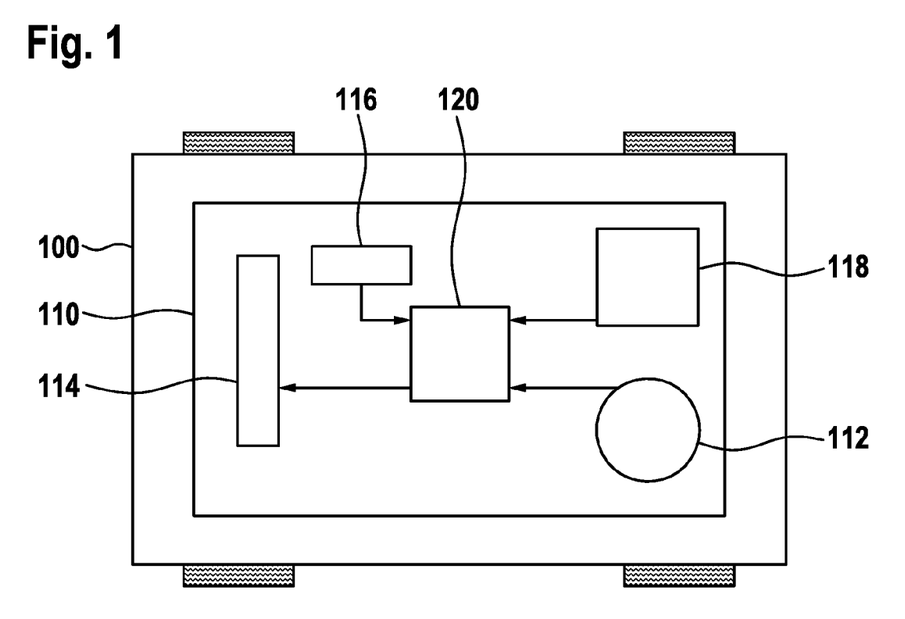
FIG. 1 is a schematic illustration of a vehicle having a brake system according to an exemplary embodiment.

FIG. 1 is a schematic illustration of a vehicle 100 having a brake system 110 according to an exemplary embodiment. The vehicle 100 is for example a utility vehicle. The brake system 110 has a fluid reservoir 112, for example a compressed-air tank, a consumer 114, for example a brake device, a control device 116, for example a footbrake valve or brake valve assigned to a brake pedal of the vehicle 100, an electronic control unit 118, for example in conjunction with an assistance system of the vehicle 100, and, by way of example, only one solenoid valve apparatus 120.

Here, in the brake system 110, the fluid reservoir 112, the consumer 114 and the control device 116 are fluidically connected to the solenoid valve apparatus 120. Furthermore, the electronic control unit 118 is connected with signal transmission capability to the solenoid valve apparatus 120. The solenoid valve apparatus 120 will be discussed in yet more detail further below with reference to the following figures.

Figure 2:
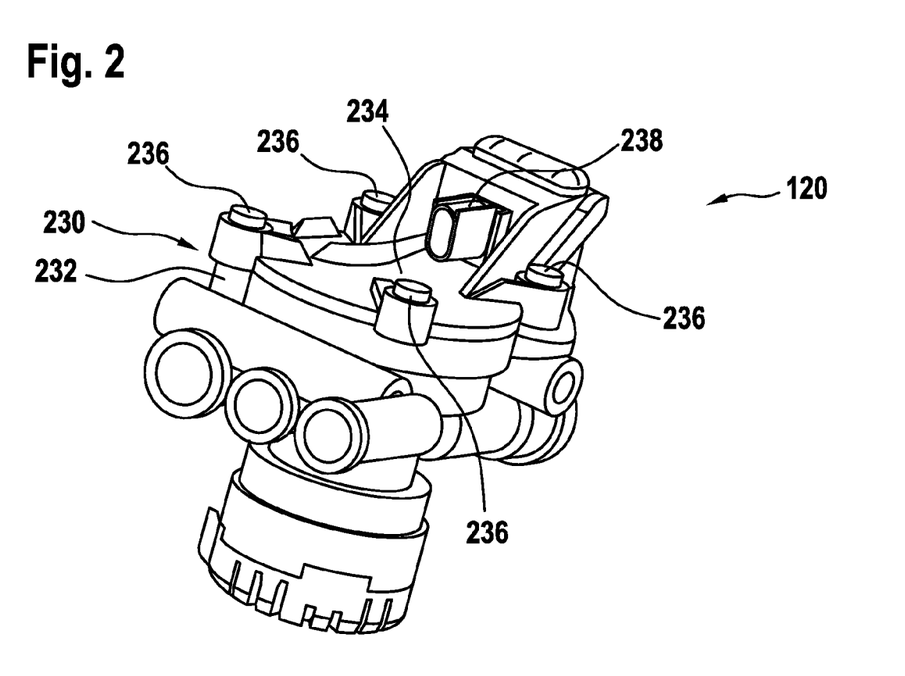
FIG. 2 is a perspective illustration of a solenoid valve apparatus according to an exemplary embodiment.

FIG. 2 is a perspective illustration of a solenoid valve apparatus 120 according to an exemplary embodiment. The solenoid valve apparatus 120 is provided for a brake system for a vehicle. Here, the solenoid valve apparatus 120 may be used for example as a front-axle module or rear-axle module of the vehicle. Here, the solenoid valve apparatus 120 corresponds, or is similar, to the solenoid valve apparatus from FIG. 1.

The solenoid valve apparatus 120 has a main valve unit, a pilot-control valve unit fluidically connected to the main valve unit, and a housing 230 for accommodating at least the main valve unit and the pilot-control valve unit. Owing to the illustration, FIG. 2 shows only the housing 230 of the solenoid valve apparatus 120.

The pilot-control valve unit has a double solenoid unit and at least one valve device. The double solenoid unit is formed such that it can be populated with at least one valve device. The double solenoid unit has at least two accommodating portions for accommodating valve devices, and has at least two solenoid devices for actuating valve devices.

In the exemplary embodiment illustrated here, the double solenoid valve unit is arranged in clamped fashion in the housing 230. Specifically, here, the double solenoid unit is arranged in clamped fashion between a first housing part 232 and a second housing part 234. Here, the first housing part 232 has, merely by way of example, a holding clip by which the double solenoid unit or the pilot-control valve unit can be clamped against the second housing part 234. Thus, as per the exemplary embodiment shown in FIG. 2, the housing 230 has the first housing part 232 and the second housing part 234. The housing parts 232 and 234 are connected to one another in non-positively locking and/or positively locking fashion.

In the exemplary embodiment shown here, the housing 230 furthermore has at least one closing device 236, wherein FIG. 2 illustrates, merely by way of example, four closing devices 236 in the form of screws. By the closing devices 236, the housing parts 232 and 234 are connected to one another. In other words, the housing 230 is openable and closable by the closing devices 236 in order to make at least the pilot-control valve unit accessible.

Merely by way of example, the first housing part 232 may be formed from a metallic material. Here, the first housing part 232 may for example be a cast part or die-cast part composed of aluminum or the like. Furthermore, the second housing part 234 may be formed from a plastics material or from a metallic material.

The pilot-control valve unit has an electrical connector for the contacting of the double solenoid unit. Owing to the illustration, FIG. 2 shows only a plug connector portion 238 of the electrical connector. The plug connector portion 238 extends out of the housing 230, in particular out of the second housing part 234.

In other words, in the case of the solenoid valve apparatus 120, the second housing part 234, which is configured as housing upper part, has a geometrical step. At this geometrical step, the double solenoid unit or the valve solenoid is fastened by the closing devices 236 or housing screws 236 to the first housing part 232, which is configured as housing lower part. Here, the plug connector portion 238 or electronic plug connector 238 of the valve solenoid projects beyond the housing 230 and can be contacted from an opposite side. In this way, a cable clamp or tension-relieving means above the second housing part 234 can also be made possible.

Figure 3:
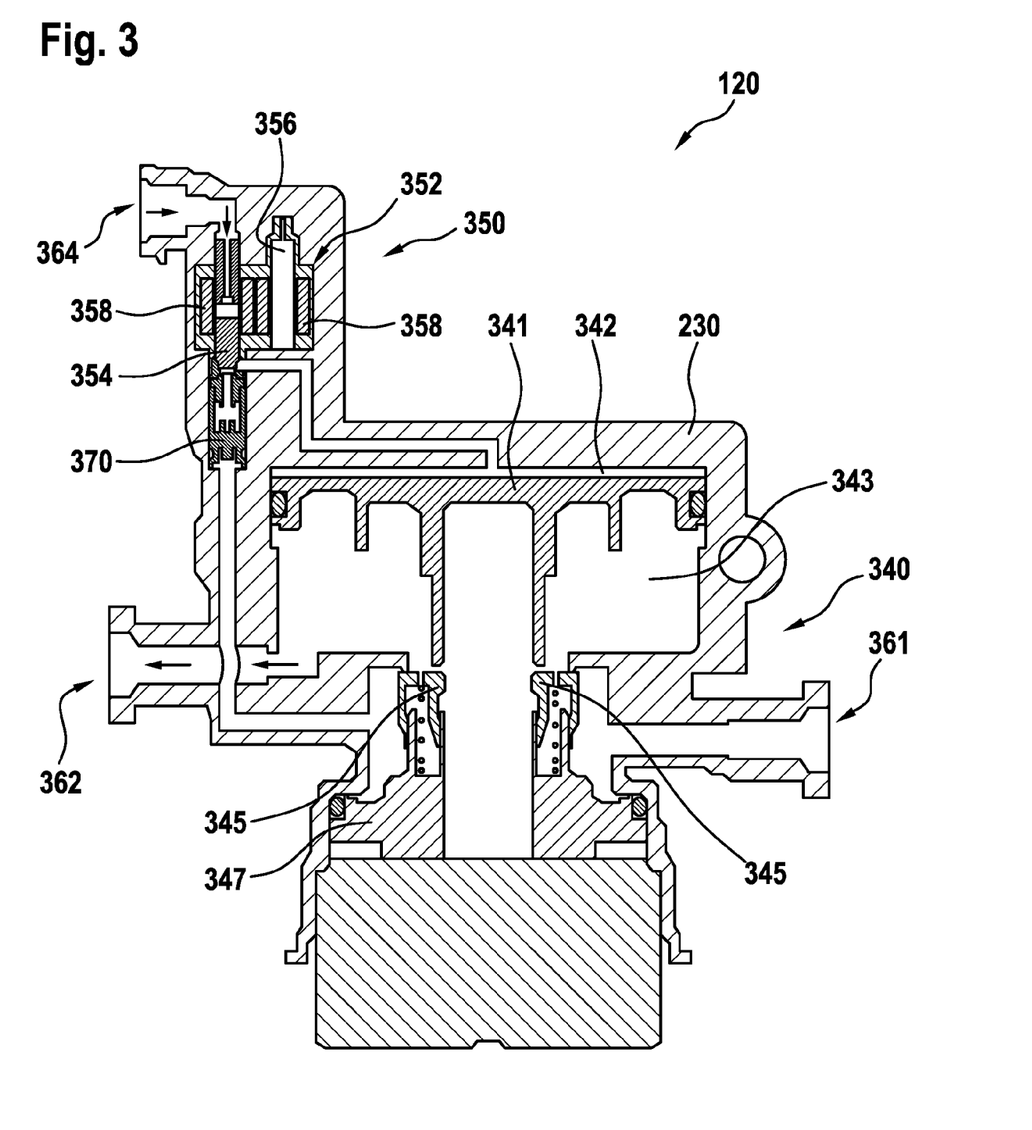
FIG. 3 is a schematic sectional illustration of a solenoid valve apparatus according to an exemplary embodiment.

FIG. 3 is a schematic sectional illustration of a solenoid valve apparatus 120 according to an exemplary embodiment. Here, the solenoid valve apparatus 120 corresponds, or is similar, to the solenoid valve apparatus from FIG. 1 or FIG. 2. In other words, FIG. 3 is in particular a schematic sectional illustration of the solenoid valve apparatus 120 from FIG. 2.

Here, a main valve unit 340 and a pilot-control valve unit 350 of the solenoid valve apparatus 120 are also shown. The solenoid valve apparatus 120 has the main valve unit 340, and the pilot-control valve unit 350 which is fluidically connected to the main valve unit 340, and the housing 230 for accommodating at least the main valve unit 340 and the pilot-control valve unit 350.

Here, the pilot-control valve unit 350 has a double solenoid unit 352 and at least one valve device 354. The double solenoid unit 352 is formed such that it can be populated with at least one valve device 354. The double solenoid unit 352 has at least two accommodating portions 356 for accommodating valve devices 354, and at least two solenoid devices 358 for actuating valve devices 354. The at least one valve device 354 has a piston which is movable by the solenoid devices 358. In particular, the accommodating portions 356 and the solenoid devices 358 of the double solenoid unit 352 are enclosed by a common body of the double solenoid unit 352. In the exemplary embodiment illustrated in FIG. 3, the valve device 354 is accommodated in a first of the accommodating portions 356 of the double solenoid unit 352, and a second of the accommodating portions 356 of the double solenoid unit 352 is unpopulated.

The double solenoid unit 352 may also be referred to as double-coil solenoid. In this exemplary embodiment, the two solenoid devices 358 are formed as two cylindrical coils. In one exemplary embodiment, the two coils are arranged at the same height and/or have central axes oriented at least approximately parallel to one another. The accommodating portions 356 are oriented along the central axes of the coils and extend through the coils. In one exemplary embodiment, the two coils are arranged adjacent to one another and are separated from one another only by a thin wall or layer. Between the coils, there is for example arranged a thin-walled wall of the body.

In the exemplary embodiment shown in FIG. 3, the solenoid valve apparatus 120 furthermore has at least one reservoir fluid port 361 for the connection of the solenoid valve apparatus 120 to the fluid reservoir of the brake system. The at least one reservoir fluid port 361 is fluidically connected to the main valve unit 340 and to the pilot-control valve unit 350. Also, the solenoid valve apparatus 120 has at least one consumer fluid port 362 for the connection of the solenoid valve apparatus 120 to the consumer of the brake system. The at least one consumer fluid port 362 is fluidically connected to the main valve unit 340. The solenoid valve device 120 furthermore has at least one control fluid port 364 for the connection of the solenoid valve apparatus 120 to the control device of the brake system. The at least one control fluid port 364 is fluidically connected to the main valve unit 340 via the pilot-control valve unit 350.

Furthermore, the solenoid valve apparatus 120 as per the exemplary embodiment illustrated in FIG. 3 has, merely by way of example, a pressure-limiting valve 370 or check valve. The pressure-limiting valve 370 is connected between the reservoir fluid port 361 and the pilot-control valve unit 350, fluidically in parallel with respect to the main valve unit 340.

For the sake of completeness, it is pointed out here that the main valve unit 340 has a control piston 341, the control chamber 342, a working chamber 343, a sealing sleeve 345, for example in the form of a double lip seal, and a guide sleeve 347.

In the case of the solenoid valve apparatus 120 being operated as a front-axle module with an armature system, two modes of operation with regard to a braking demand will be briefly discussed below by way of example. One mode of operation represents service braking, wherein a driver brakes the vehicle. Compressed air as control fluid originates for example from a footbrake valve as control device, enters the control fluid port 364 and flows through the pilot-control valve unit 350 into the control chamber 342 of the main valve unit 340. The control piston 341 moves downward and opens the sealing sleeve 345 or moves the sealing sleeve 345. Compressed air as working fluid flows from the reservoir fluid port 361 into the working chamber 343 and to the consumer fluid port 362. The working fluid may have a higher pressure than the control fluid. A further mode of operation represents, for example, a drive slip control operation or the like, wherein the pilot-control valve unit 350 is switched. The pressure of the working fluid from the control chamber 342 and working chamber 343 is reduced by the pressure-limiting valve 370 as pressure reducer. The control piston 341 moves downward and opens the sealing sleeve 345. The working fluid flows from the reservoir fluid port 361 into the working chamber 343 and to the consumer fluid port 362.

In one exemplary embodiment, the ports 361, 362, 364 are formed as external interfaces of the solenoid valve device 120. For example, the ports 361, 362, 364 may be used in order to couple the solenoid valve apparatus 120 to compressed-air lines of a brake system of a vehicle. For this purpose, each of the ports 361, 362, 364 may have at least one suitable coupling element for releasable coupling to a compressed-air line.

In one exemplary embodiment, the internal lines shown in FIG. 3 and running within the solenoid valve apparatus 120, which serve in particular for the connection of the main valve unit 340 to the pilot-control valve unit 350 and for the connection of the valve units 340, 350 to the respective ports 361, 362, 364, are formed by suitable cutouts within the housing 230.

Figure 4:
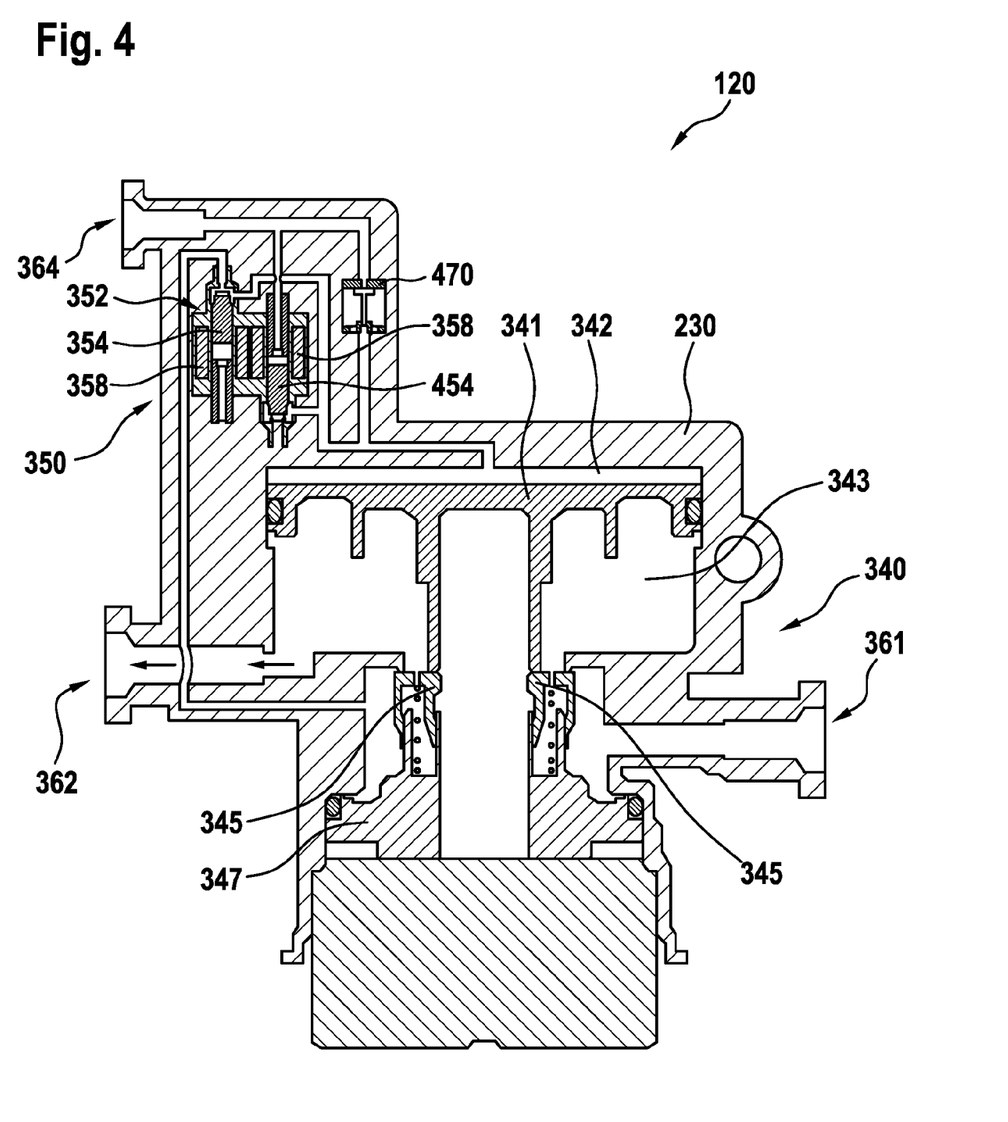
FIG. 4 is a schematic sectional illustration of a solenoid valve apparatus according to an exemplary embodiment.

FIG. 4 is a schematic sectional illustration of a solenoid valve apparatus 120 according to an exemplary embodiment. Here, the solenoid valve apparatus 120 corresponds to the solenoid valve apparatus from FIG. 3, with the exception that the pilot-control valve unit 350 has the valve device 354 and a further valve device 454, that, as a result, a fluidic interconnection of pilot-control valve unit 350 and main valve unit 340 is adapted thereto, and that the solenoid valve apparatus 120 has a check valve 470. In other words, the solenoid valve apparatus 120 has for example a front-axle module with two armature systems.

Here, the valve device 354 is accommodated in a first of the accommodating portions of the double solenoid unit 352. The further valve device 454 is accommodated in a second of the accommodating portions of the double solenoid unit 352. The check valve 470 is connected between the control fluid port 364 of the solenoid valve apparatus 120 and the main valve unit 340, fluidically in parallel with respect to the pilot-control valve unit 350.

Various modes of operation of the solenoid valve apparatus 120 from FIG. 4 will be discussed briefly below. Here, the valve device 354 together with the associated solenoid device 358 may also be referred to as inlet solenoid 354 or ASR (drive slip control) inlet solenoid 354, and the further valve device 454 together with the associated solenoid device 358 may also be referred to as outlet solenoid 454 or ASR outlet solenoid 454.

When a service brake of the vehicle is actuated by a driver, air or compressed air as control fluid originates from a footbrake valve and flows through the outlet solenoid 454 into the control chamber 342. The control piston 341 moves downward and opens the sealing sleeve 345. Air or compressed air as working fluid flows from the reservoir fluid port 361 into the working chamber 343 and to the consumer fluid port 362.

A further mode of operation concerns central pressure control (CPC) in the vehicle. Here, when pressure is built up, the outlet solenoid 454 is switched, wherein the inlet solenoid 354 pulses such that air with reservoir pressure or working fluid flows into the control chamber 342. Owing to the switched outlet solenoid 454, the relatively high pressure of the working fluid cannot escape through the control fluid port 364. The control piston 341 moves downward and opens the sealing sleeve 345. Air or compressed air as working fluid flows from the reservoir fluid port 361 into the working chamber 343 and to the consumer fluid port 362. In the event of a so-called CPC bypass, wherein the driver increases a brake pressure, the pressure flows through the check valve 470 or throttling check valve 470 into the control chamber 342. The control piston 341 moves downward and opens the sealing sleeve 345. When it is sought to build up pressure, the outlet solenoid 454 pulses, and the control piston 341 moves upward and reduces the pressure in the main valve unit 340 or in the relay part.

A further mode of operation concerns a hill start aid (HSA). Here, when pressure is to be built up, the outlet solenoid 454 is switched or activated. When the driver reduces brake pressure in order to launch the vehicle or set the vehicle in motion, the relatively high pressure of the working fluid cannot escape to the control fluid port 364 owing to the switched outlet solenoid 454. The inlet solenoid 354 pulses and the pressure flows into the control chamber 342. The control piston 341 moves downward and opens the sealing sleeve 345. The outlet solenoid 454 is deactivated. The control piston 341 moves upward, and the pressure in the main valve unit 340 or in the relay part is reduced.

Figure 5:
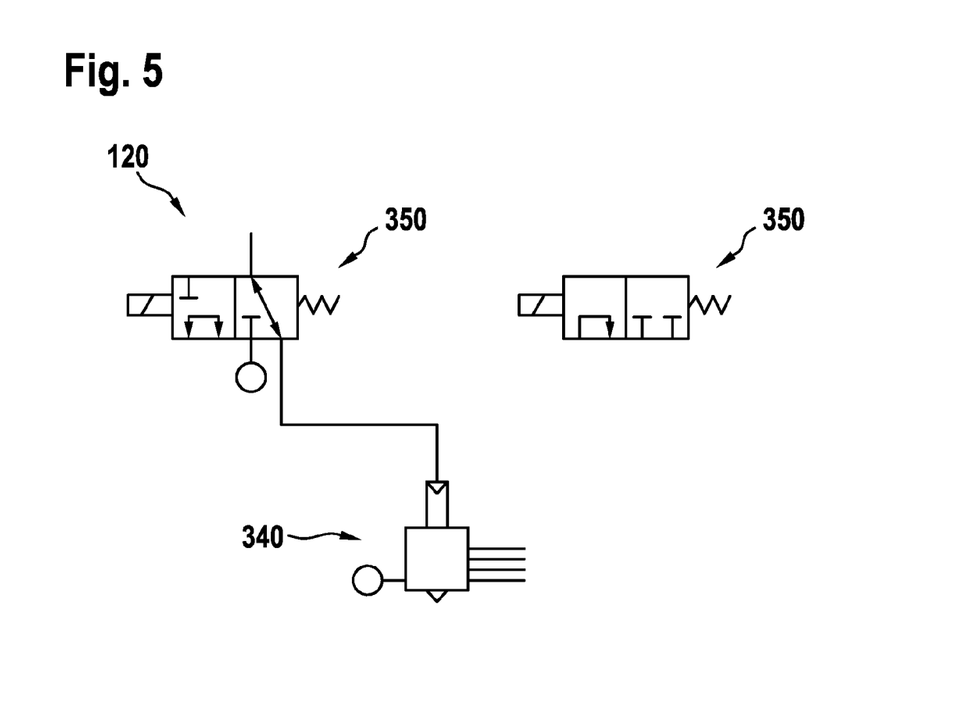
FIG. 5 shows a schematic circuit diagram of a solenoid valve apparatus according to an exemplary embodiment.

FIG. 5 shows a schematic circuit diagram of a solenoid valve apparatus 120 according to an exemplary embodiment. Here, solenoid valve apparatus 120 corresponds, or is similar, to the solenoid valve apparatus from FIG. 3. Of the solenoid valve apparatus 120, FIG. 5 illustrates, in the circuit diagram, elements of the pilot-control valve unit 350 and the main valve unit 340 using conventional circuit symbols. Here, it is possible in particular to see that the pilot-control valve unit 350 is populated on one side. The unpopulated accommodating portion of the pilot-control valve unit 350 is in this case illustrated by an unconnected valve unit without implemented openings.

Figure 6:
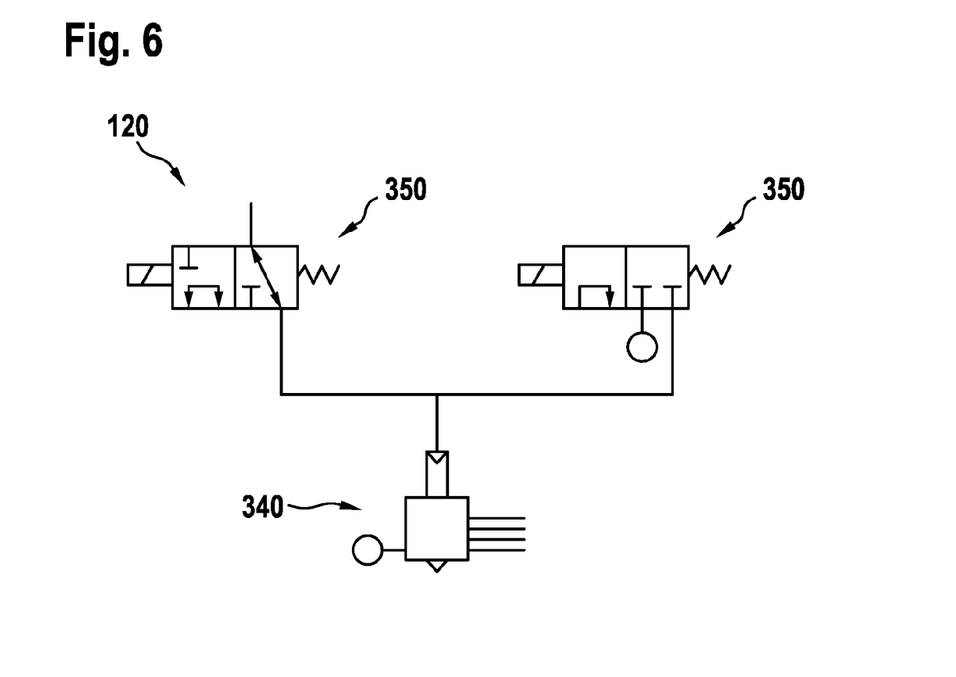
FIG. 6 shows a schematic circuit diagram of a solenoid valve apparatus according to an exemplary embodiment.

FIG. 6 shows a schematic circuit diagram of a solenoid valve apparatus 120 according to an exemplary embodiment. The solenoid valve apparatus 120 is in this case similar to the solenoid valve apparatus from FIG. 4. Of the solenoid valve apparatus 120, FIG. 6 illustrates, in the circuit diagram, elements of the pilot-control valve unit 350 and the main valve unit 340 using conventional circuit symbols. Here, it is possible in particular to see that the pilot-control valve unit 350 is populated on both sides.

Figure 7:
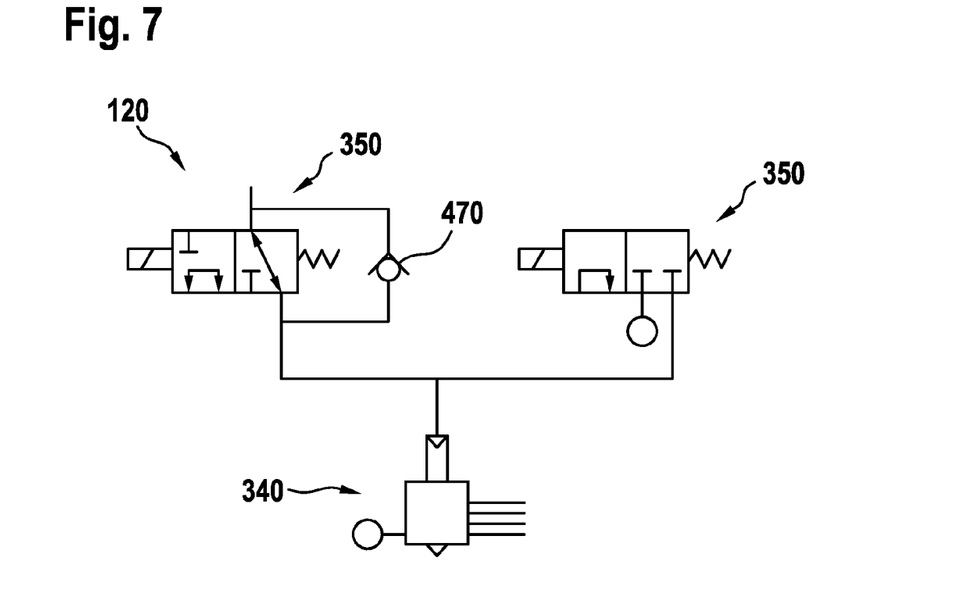
FIG. 7 shows a schematic circuit diagram of a solenoid valve apparatus according to an exemplary embodiment.

FIG. 7 shows a schematic circuit diagram of a solenoid valve apparatus 120 according to an exemplary embodiment. The solenoid valve apparatus 120 in this case corresponds or is similar to the solenoid valve apparatus from FIG. 4. Of the solenoid valve apparatus 120, FIG. 7 illustrates, in the circuit diagram, elements of the pilot-control unit 350 and the check valve 470 and the main valve unit 340 using conventional circuit symbols. Here, it is possible in particular to see that the pilot-control valve 350 is populated on both sides, and to see the check valve 470 connected in parallel.

Figure 8:
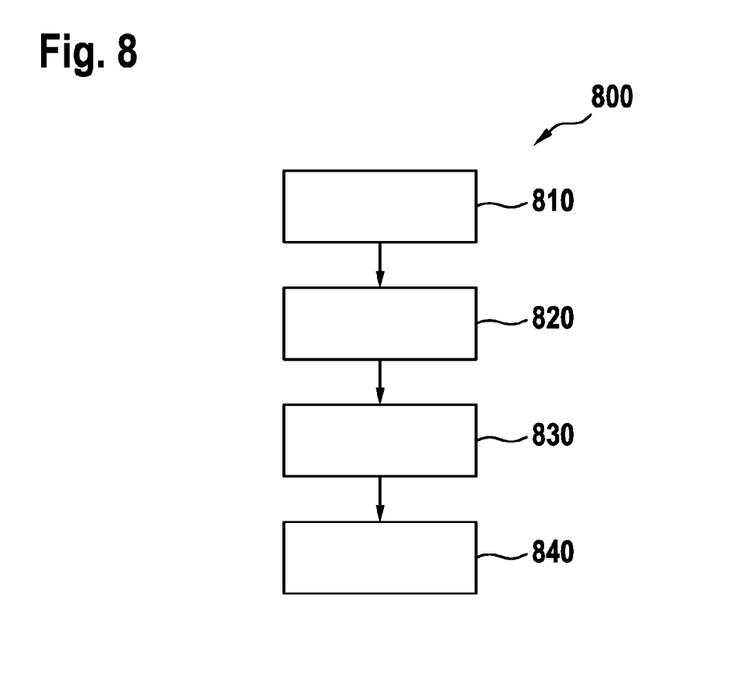
FIG. 8 shows a flow diagram of a method for assembling according to an exemplary embodiment.

FIG. 8 shows a flow diagram of a method 800 assembling as per an exemplary embodiment. The method 800 can be carried out in order to assemble a solenoid valve apparatus for a brake system for a vehicle. Here, the brake system corresponds, or is similar, to the brake system from FIG. 1. The solenoid valve apparatus corresponds, or is similar, to the solenoid valve apparatus from one of the preceding figures.

The method 800 for assembling has a step 810 of providing a solenoid valve apparatus for a brake system for a vehicle. The solenoid valve apparatus provided in the step 810 of providing corresponds, or similar, to the solenoid valve apparatus from any of the preceding figures. Furthermore, the method 800 for assembling has a step 820 of arranging the double solenoid unit in the pilot-control valve unit. The method 800 for assembling also has a step 830 of inserting the at least one valve device into at least one of the accommodating portions of the double solenoid unit in order to populate the double solenoid unit. Furthermore, the method 800 for assembling has a step 840 of closing the housing in order to house the pilot-control valve unit and the main valve unit.

Figure 9:
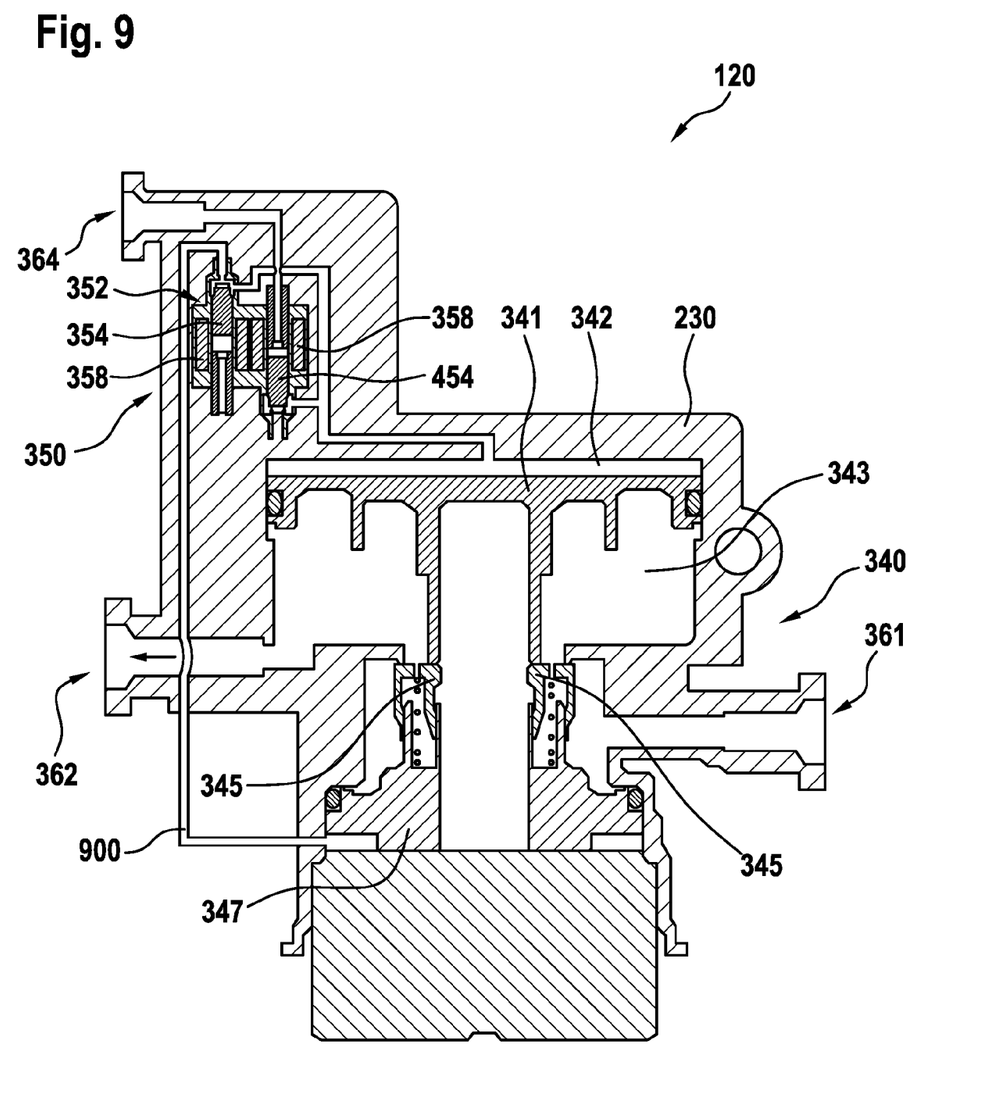
FIG. 9 is a schematic sectional illustration of a solenoid valve apparatus according to an exemplary embodiment.

FIG. 9 is a schematic sectional illustration of a solenoid valve apparatus 120 according to an exemplary embodiment. The solenoid valve apparatus 120 corresponds here to the solenoid valve apparatus from FIG. 4, with the exception that the reservoir fluid port 361 is fluidically connected only to the main valve unit 340, the channel comprising the check valve, together with the check valve, has been omitted, and a channel 900 for the ventilation of the solenoid valve apparatus 120 is provided. The channel 900 is fluidically connected to the pilot-control valve unit 350.

By connection of the channel 900 to a ventilation sink rather than to the reservoir fluid port 361 as in FIG. 4, the solenoid valve apparatus 120 can be used as a pressure dissipation valve and/or as a pressure-maintaining valve for ABS (anti-lock system) control.

Referring to the figures above, it is stated in summary, and in other words, that the solenoid valve apparatus 120 is configured for example as a scalable front-axle module or rear-axle module. Scalability can be achieved in particular through the fundamental use of the double solenoid unit 352 or a double solenoid in the pilot-control valve unit 350. In the case of some modes of operation (ASR and ESP, or electronic stability program), the double solenoid unit 352 is populated only on one side. In the case of population on both sides, it is also possible for intermediate pressures to be set in controlled fashion in the main valve unit 340 or in the relay valve. This may be expedient in the case of other modes of operation such as for example in ACC (adaptive cruise control) systems. In the case of double population, it is also possible for a check valve 470 on one side to be used, in order that the driver demand has priority over the automatic braking.

If an exemplary embodiment comprises an "and/or" link between a first feature and a second feature, this is to be read as meaning that the exemplary embodiment, in one embodiment, has both the first feature and the second feature and, in a further embodiment, has either only the first feature or only the second feature.

The LIST OF REFERENCE DESIGNATIONS is as follows:
100 Vehicle
110 Brake system
112 Fluid reservoir
114 Consumer
116 Control device
118 Electronic control unit
120 Solenoid valve apparatus
230 Housing
232 First housing part
234 Second housing part
236 Closing device
238 Plug connector portion
340 Main valve unit
341 Control piston
342 Control chamber
343 Working chamber
345 Sealing sleeve
347 Guide sleeve
350 Pilot control valve unit
352 Double solenoid unit
354 Valve device
356 Accommodating portion
358 Solenoid device
361 Reservoir fluid port
362 Consumer fluid port
364 Control fluid port
370 Pressure-limiting valve
454 Further valve device
470 Check valve
800 Method for assembling
810 Step of providing
820 Step of arranging
830 Step of inserting
840 Step of closing
900 Channel

The invention claimed is:

1. A solenoid valve apparatus for a brake system for a vehicle, comprising:
   a main valve unit;
   a pilot-control valve unit that is fluidically connected to the main valve unit; and
   a housing to accommodate at least the main valve unit and the pilot-control valve unit; and
   a check valve connected between a control fluid port of the solenoid valve apparatus and the main valve unit, fluidically in parallel with respect to the pilot-control valve unit, and/or is connected between a reservoir fluid port of the solenoid valve apparatus and the pilot-control valve unit, fluidically in parallel with respect to the main valve unit, wherein when a central-pressure-control (CPC) bypass occurs because a driver increases a brake pressure, the pressure flows through the check valve into a control chamber of the main valve unit;

wherein the pilot-control valve unit includes a double solenoid unit and at least one valve device, wherein the double solenoid unit is formed such that it can be populated with at least one valve device, and wherein the double solenoid unit has at least two accommodating portions for accommodating valve devices and at least two solenoid devices for actuating valve devices, wherein two coils of the double solenoid unit are arranged adjacent to one another and are separated from one another by a thin wall or layer of a common body of the double solenoid unit, wherein the housing includes a first housing part and a second housing part, which is configured as a housing upper part and which has a geometrical step, wherein at the geometrical step, the double solenoid unit or the valve solenoid is fastened by at least one closing device to the first housing part, which is configured as a housing lower part, and wherein the main valve unit has a control piston, the control chamber, a working chamber, a sealing sleeve, and a guide sleeve, the guide sleeve being in the form of a double lip seal, and wherein the sealing sleeve is opened or moved when the control piston moves downwardly.

2. The solenoid valve apparatus of claim 1, wherein the accommodating portions and the solenoid devices of the double solenoid unit are enclosed by a common body of the double solenoid unit.

3. The solenoid valve apparatus of claim 1, wherein the double solenoid unit is arrangeable or arranged in a clamped manner in the housing.

4. The solenoid valve apparatus of claim 1, wherein the housing has the at least one closing device by which the housing is openable and closable to make at least the pilot-control valve unit accessible.

5. The solenoid valve apparatus of claim 1, wherein the housing has a first housing part and a second housing part, wherein the housing parts are connectable or connected to one another in a non-positively locking and/or a positively locking manner, and wherein the double solenoid unit is arrangeable in a clamped manner between the housing parts.

6. The solenoid valve apparatus of claim 1, wherein the housing is formed at least partially from a metallic material or is formed partially from a metallic material and partially from a plastics material.

7. The solenoid valve apparatus of claim 1, wherein the pilot-control valve unit has an electrical connector for the contacting of the double solenoid unit, and wherein a plug connector portion of the electrical connector extends out of the housing.

8. The solenoid valve apparatus of claim 1, wherein the valve device is accommodated in a first of the accommodating portions of the double solenoid unit and a second of the accommodating portions of the double solenoid unit is unpopulated, or the valve device is accommodated in a first of the accommodating portions of the double solenoid unit and a further valve device is accommodated in a second of the accommodating portions of the double solenoid unit.

9. The solenoid valve apparatus of claim 1, further comprising:

at least one reservoir fluid port for connecting the solenoid valve apparatus to a fluid reservoir of the brake system, wherein the at least one reservoir fluid port is fluidically connected to the main valve unit and to the pilot-control valve unit;

at least one consumer fluid port for connecting the solenoid valve apparatus to a consumer of the brake system, wherein the at least one consumer fluid port is fluidically connected to the main valve unit; and at least one control fluid port for connecting the solenoid valve apparatus to a control device of the brake system, wherein the at least one control fluid port is fluidically connected to the main valve unit via the pilot-control valve unit.

10. The solenoid valve apparatus of claim 1, further comprising:

at least one reservoir fluid port for connecting the solenoid valve apparatus to a fluid reservoir of the brake system, wherein the at least one reservoir fluid port is fluidically connected to the main valve unit;

at least one channel for the ventilation of the solenoid valve apparatus, wherein the at least one channel is fluidically connected to the pilot-control valve unit;

at least one consumer fluid port for connecting the solenoid valve apparatus to a consumer of the brake system, wherein the at least one consumer fluid port is fluidically connected to the main valve unit; and at least one control fluid port for connecting the solenoid valve apparatus to a control device of the brake system, wherein the at least one control fluid port is fluidically connected to the main valve unit via the pilot-control valve unit.

11. A brake system for a vehicle, comprising:

at least one solenoid valve apparatus, including:
a main valve unit;
a pilot-control valve unit that is fluidically connected to the main valve unit; and
a housing to accommodate at least the main valve unit and the pilot-control valve unit; and
a check valve connected between a control fluid port of the solenoid valve apparatus and the main valve unit, fluidically in parallel with respect to the pilot-control valve unit, and/or is connected between a reservoir fluid port of the solenoid valve apparatus and the pilot-control valve unit, fluidically in parallel with respect to the main valve unit, wherein when a central-pressure-control (CPC) bypass occurs because a driver increases a brake pressure, the pressure flows through the check valve into a control chamber of the main valve unit;

wherein the pilot-control valve unit includes a double solenoid unit and at least one valve device, wherein the double solenoid unit is formed such that it can be populated with at least one valve device, and wherein the double solenoid unit has at least two accommodating portions for accommodating valve devices and at least two solenoid devices for actuating valve devices, and wherein two coils of the double solenoid unit are arranged adjacent to one another and are separated from one another by a thin wall or layer of a common body of the double solenoid unit, and wherein the housing includes a first housing part and a second housing part, which is configured as a housing upper part and which has a geometrical step, wherein at the geometrical step, the double solenoid unit or the valve solenoid is fastened by at least one closing device to the first housing part, which is configured as a housing lower part, and wherein the main valve unit has a control piston, the control chamber, a working chamber, a sealing sleeve, and a guide sleeve, the guide sleeve being in the form of a double lip seal, and wherein the sealing sleeve is opened or moved when the control piston moves downwardly.

12. The brake system of claim 11, wherein the at least one solenoid valve apparatus is configured to actuate a front axle and/or a rear axle of the vehicle, wherein the brake system has at least one switching valve, and wherein the at least one solenoid valve apparatus and the at least one switching valve are configured to interact.

13. A method for assembling a solenoid valve apparatus for a brake system for a vehicle, the method comprising:

providing a solenoid valve apparatus, wherein the solenoid valve apparatus includes:

a main valve unit;

a pilot-control valve unit that is fluidically connected to the main valve unit; and a housing to accommodate at least the main valve unit and the pilot-control valve unit; and a check valve connected between a control fluid port of the solenoid valve apparatus and the main valve unit, fluidically in parallel with respect to the pilot-control valve unit, and/or is connected between a reservoir fluid port of the solenoid valve apparatus and the pilot-control valve unit, fluidically in parallel with respect to the main valve unit, wherein when a central-pressure-control (CPC) bypass occurs because a driver increases a brake pressure, the pressure flows through the check valve into a control chamber of the main valve unit;

wherein the pilot-control valve unit includes a double solenoid unit and at least one valve device, wherein the double solenoid unit is formed such that it can be populated with at least one valve device, and wherein the double solenoid unit has at least two accommodating portions for accommodating valve devices and at least two solenoid devices for actuating valve devices;

arranging the double solenoid unit in the pilot-control valve unit;

inserting the at least one valve device into at least one of the accommodating portions of the double solenoid unit to populate the double solenoid unit; and closing the housing to house the pilot-control valve unit and the main valve unit;

wherein two coils of the double solenoid unit are arranged adjacent to one another and are separated from one another by a thin wall or layer of a common body of the double solenoid unit, and wherein the housing includes a first housing part and a second housing part, which is configured as a housing upper part and which has a geometrical step, wherein at the geometrical step, the double solenoid unit or the valve solenoid is fastened by at least one closing device to the first housing part, which is configured as a housing lower part, and wherein the main valve unit has a control piston, the control chamber, a working chamber, a sealing sleeve, and a guide sleeve, the guide sleeve being in the form of a double lip seal, and wherein the sealing sleeve is opened or moved when the control piston moves downwardly.

* * * * *